H. HAUER.
PADDING OR STUFFING FOR HARNESS.
No. 84,116.                                Patented Nov. 17, 1868.
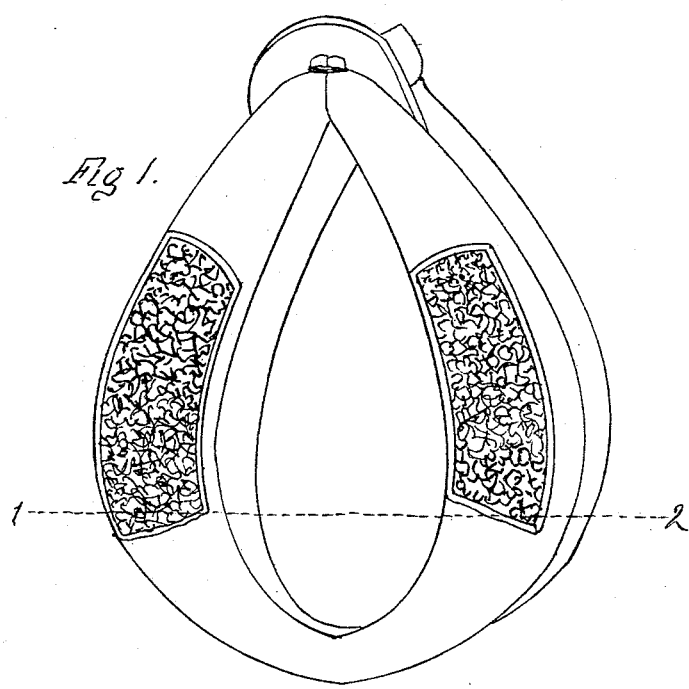
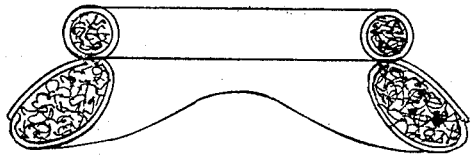

HENRY HAUER, OF PHILADELPHIA, PENNSYLVANIA.

*Letters Patent No. 84,116, dated November 17, 1868.*

IMPROVED PADDING OR STUFFING FOR HARNESS.

The Schedule referred to in these Letters Patent and making part of the same.

*To all whom it may concern:*

Be it known that I, HENRY HAUER, of Philadelphia, Pennsylvania, have invented an Improvement in Padding or Stuffing for Harness; and I do hereby declare the following to be a full, clear, and exact description of the same.

My invention consists in stuffing or padding collars, saddles, and other parts of harness with granulated cork, combined with gum-elastic or other suitable cement, as and for the purpose described hereafter.

In order to enable others skilled in the art to practise my invention, I will now proceed to describe the mode of carrying the same into effect, reference being had to the accompanying drawing, which forms a part of this specification, and in which—

Figure 1 represents a rear view, partly in section, of a horse-collar, made in accordance with my improvement, and Figure 2, a sectional plan, on the line 1-2, fig. 1.

The casing of the collar is made of leather, or of other suitable material, but, instead of being stuffed with hair or straw, the casing is filled with granulated cork, mixed with a solution of gum-elastic, in naphtha or benzine, so that a pasty mass is produced, to be forced into the casing, where in a short time it becomes almost homogeneous, the particles of cork being united by the gum-elastic solution.

An elastic stuffing is thus produced, and one which more readily accommodates itself to the form of the horse than hair or straw, the cork stuffing being more elastic when subjected to the heat resulting from the pressure and attrition against the body of the animal.

Another advantage of my improvement is that the cork is a non-conductor of heat and a non-absorbent of moisture, qualities which render it especially applicable to the purpose of stuffing those articles of harness which have to bear with more or less pressure on the animal.

In place of the solution of gum-elastic, any gum or cement capable of uniting the particles of cork may be used, and the granulated cork may be subjected to a preparatory process of charring or roasting, prior to being used, in the manner described in the patent of Louis Bauhefer, granted November 6, 1866, in which case the packing will be very light, compared with the usual packing of hair or straw.

It will be evident that the padded portions of saddles and other parts of harness may be stuffed in the manner described, and that the packing or filling may be moulded to proper shape prior to its introduction into the cover, or prior to the application of the cover to the moulded packing.

I claim as my invention, and desire to secure by Letters Patent—

The stuffing of collars, saddles, and other parts of harness, with granulated cork, combined with a gum-elastic or other equivalent cement, as and for the purpose herein set forth.

In testimony whereof, I have signed my name to this specification, in the presence of two subscribing witnesses.

HENRY HAUER.

Witnesses:
 JOHN WHITE,
 C. B. PRICE.